Dec. 26, 1961 C. L. BARCIA ET AL 3,014,412

RECORD PERFORATING APPARATUS

Filed June 25, 1958 4 Sheets-Sheet 1

INVENTORS
CASPER L. BARCIA
GEORGE MICKLUS
BY Harry T. Berriman
AGENT

Dec. 26, 1961 C. L. BARCIA ET AL 3,014,412

RECORD PERFORATING APPARATUS

Filed June 25, 1958 4 Sheets-Sheet 2

Dec. 26, 1961 C. L. BARCIA ET AL 3,014,412

RECORD PERFORATING APPARATUS

Filed June 25, 1958 4 Sheets-Sheet 4

3,014,412

RECORD PERFORATING APPARATUS

Casper L. Barcia and George Micklus, Poughkeepsie, N.Y., assignors to International Business Machines Corporation, New York, N.Y., a corporation of New York Filed June 25, 1958, Ser. No. 744,576
1 Claim. (Cl. 93—1)

This invention relates to record punching apparatus and more particularly to record punching apparatus for punching holes in desired ones of scored or partially perforated index positions of record cards or the like, the punched record cards then being utilized in well known card controlled accounting systems.

In the well known card controlled accounting systems, data is recorded by the perforating or marking of certain index positions on the record cards. In particular situations it is desirable to perforate at the source of data. Various means, heretofore, have been utilized to accomplish this.

One of these means for recording data at the source has been to utilize portable hand punches of various types. However in most instances these punches do not offer the prerequisite degree of accuracy in the disposition of card perforations, which is of paramount importance in any subsequent sensing operation.

Another of the means for recording data has been the use of record cards in which all possible perforation positions are partially prepunched or scored with the punching being completed at the source in desired index positions and columns of the record cards by the utilization of manually operated styles or the like to completely punch out the desired one of the scored areas. This procedure provides the requisite degree of accuracy of punch registration but is tedious and time consuming.

It would be extremely advantageous in certain applications such, as for example, an insurance application wherein a route man makes weekly, bi-weekly, or monthly collections from individual policy holders, if each policy holder were provided with a cheap, rapid, easily operated punching device for punching into a partially pre-punched card presented by the route man, individual identifying data such as name, age, address, policy number or the like. The above desirable goal is fulfilled in the subject invention which comprises, briefly, the provision of each of the source customer or the like with a so-called ID or identification plate, the plate containing individual punching projections of unique characteristics. The route man carries with him a light, simple die block member having punch slots of unique characteristics for cooperation with the punching projections of the individual's ID plate at any location. At each source location, the route man places a scored record card over the die block and properly registers it thereon by suitable guide members integral with the block. The customer's ID plate is then placed on the die block and also registered thereon by the die block guide members. Thereafter by a single manual operation of a pressure plate against the ID plate or by a direct manual pressure on the ID plate itself, the punch projection of the ID plate perforates desired ones of the second areas of the record card to enter thence multi-character identifying data such as name, policy number, or the like. This operation is repeated at each source location thus producing a series of individual source records of high quality that may be later processed by conventional punch card controlled apparatus at a central location. Other obvious application of the improved source record punching apparatus would be in gasoline station charge accounts, department store charge accounts, and the like wherein each customer having a bonafide account carries with him an ID card for punching customer identification manifestations into scored record cards or the purchase of gasoline or the like. It will be appreciated that in the case of nationwide gasoline charge accounts, for example, the punching of personal accurate identifying data into the item purchase cards at the source permits all charges to eventually be properly assessed against the proper customer, through a centralized processing center, with no chance for charging the items to wrong accounts.

In the subject punching apparatus, the dimensions of the punching elements on the ID (identification) plate, the record card thickness, the dimensions of the scored area for each possible punch position, and the dimension of the punch slots in the backing die block or plate are uniquely related so that a positive removal of desired ones of the scored areas of a record is effected on punching, the punching elements project beyond the ID plate a limited distance so that it is convenient to handle and carry in the customer's pocketbook, pocket etc., and also in the actual punch operation, the punched areas or chips move through the punch slots in the die plate in an orderly manner and are discharged therefrom, so that jamming of the punching apparatus due to buildup of punch chips, is prevented. The chips removal problem is a major obstacle to reliable operation of manual punches due to the relatively low manual pressure available.

It is accordingly an object of the invention to provide an improved manually operated punching apparatus for effecting simultaneous, multi-columnar punching of scored record cards.

It is a further object to provide an improved manually operated punching apparatus that is inexpensive, light weight, portable, and accurate, for effecting simultaneous multi-columnar punching in a scored record card.

It is a further object of the invention to provide improved manually operated punching apparatus comprising a lightweight, inexpensive, personal identification plate having punching projections of limited length for effecting in conjunction with die slots in a mating die plate, a positive punching of desired scored areas of an intervening pre-scored record card, all areas being punched simultaneously.

It is a further object to provide an improved manually operated punching apparatus for effecting simultaneous multi-column punching of scored record card wherein punch chips buildup is prevented thus preventing jamming of the punch mechanism.

It is a still further object of the invention to provide an improved manually operated punching apparatus comprising a punching plate having a plurality of punching projections of limited length for effecting in conjunction with die slots in a mating die plate, a positive punching of desired ones of scored index areas of an intervening record card and wherein the dimensions of the punching projections, record card thickness, preperforated record card area, and die plate slot, are related in a unique way to provide positive chip removal from the record card, and to prevent a buildup of punch chips in the die plate.

It is a further object of the invention to provide an improved punching apparatus as in the immediately preceding object wherein by the proper relation of the dimensions of the various punching elements, punch chips are displaced through the slots in the die plate in a stacked orderly, manner by each punch operation to prevent jamming of the punch apparatus by punch chip buildup.

Other objects of the invention will be pointed out in the following description and claim and illustrated in the accompanying drawings, which disclose, by way of example, the principle of the invention and the best mode, which has been contemplated, of applying that principle.

Figure 5A:
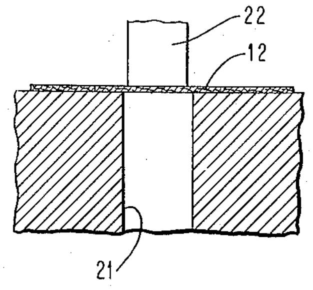
Figure 5B:
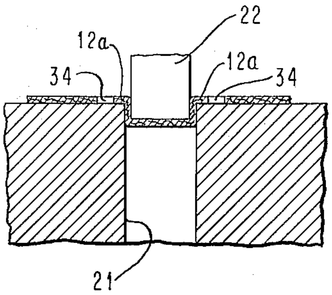
Figure 5C:
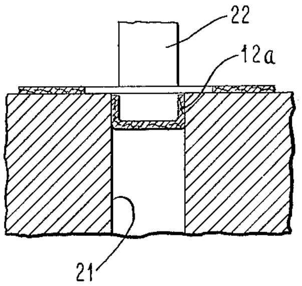

FIGS. 5A, 5B and 5C are each partial diagrammatic section views illustrating the relationship of the various cooperating punch apparatus elements during various stages of a punching or perforating operation, FIG. 5A illustrating the relationship of the parts before actual punching, FIG. 5B illustrating the relationship of the parts during punching, while FIG. 5C illustrates the relationship of the various parts after punching.

Figure 6:
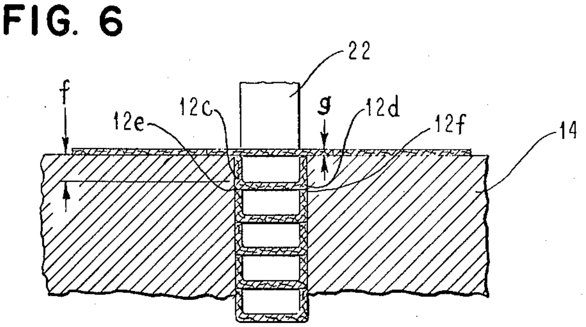

FIG. 6 is a partial diagrammatic section view also illustrating the dimensional relationship of the various cooperating elements of the punching apparatus and also illustrates the manner in which the punch chips are successively displaced through the die plate slots to prevent any punch chip jamming of the punch apparatus.

Figure 7:
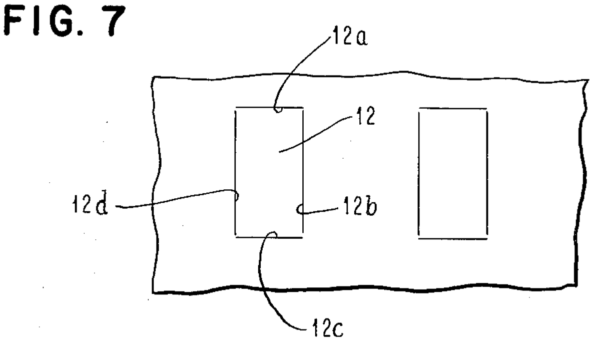

FIG. 7 is an enlarged plan view of one of the scored index areas of the record cards utilized in the punching apparatus.

Figure 8B:
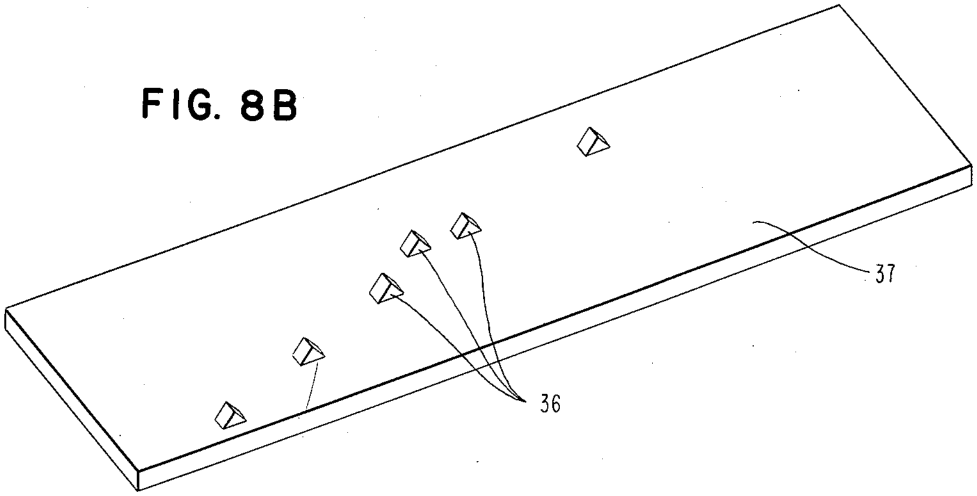
Figure 8A:
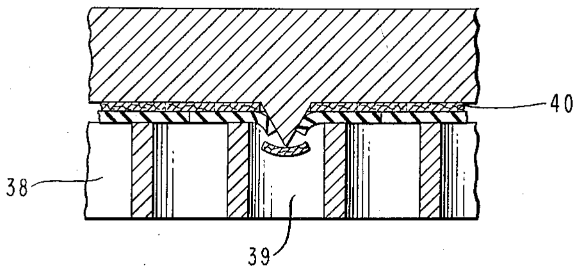

FIG. 8A is a partial diagrammatic section view of an alternate punching apparatus.

FIG. 8B is a perspective view of the identification punching plate utilized in the embodiment of FIG. 8A.

Figure 1:
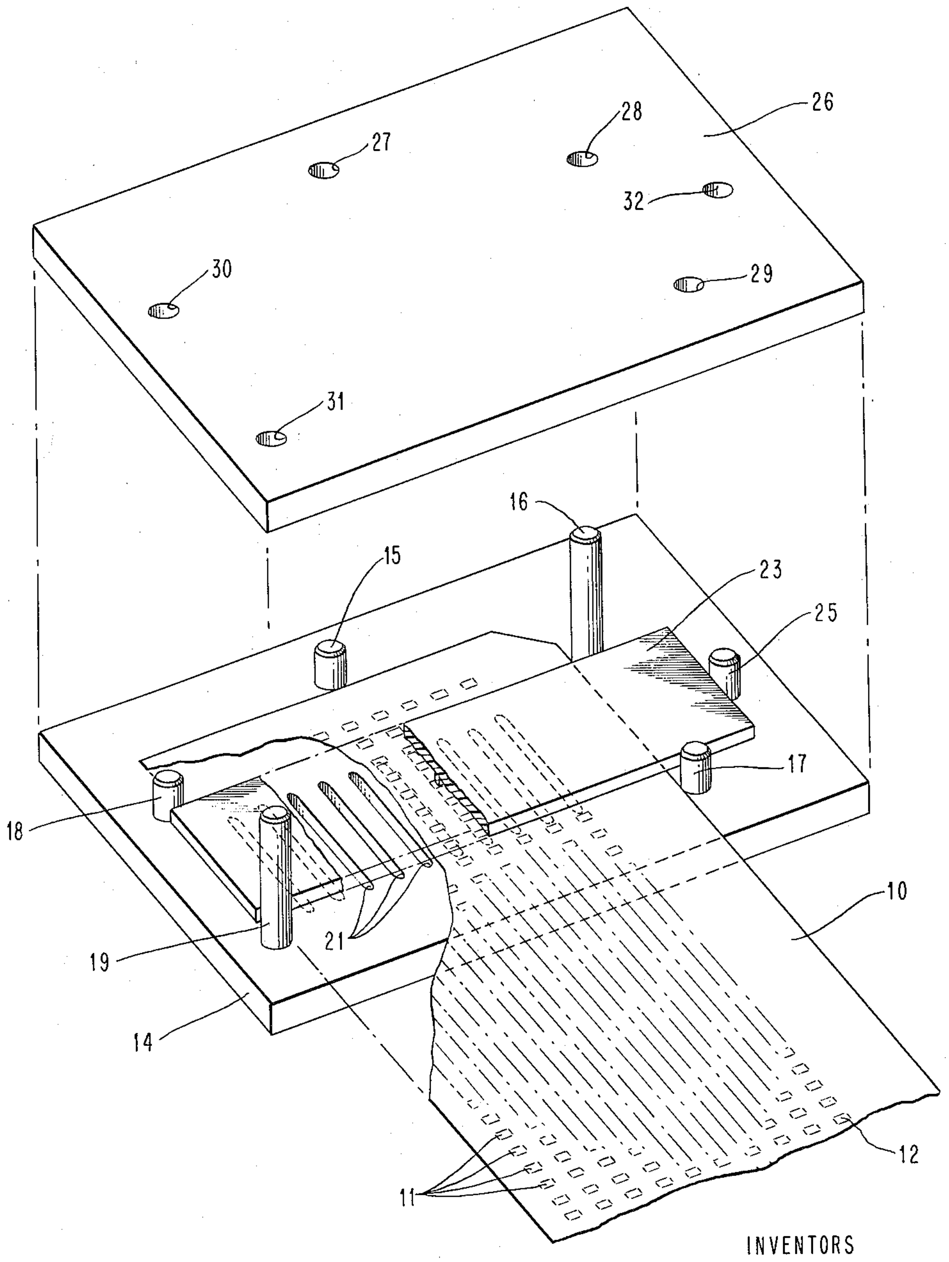
FIG. 1 is an exploded perspective view of the improved punching apparatus with a scored record card in punching position.

Referring now to FIG. 1 the positional relationships of the various cooperating elements of the improved punching apparatus are indicated relative to a scored record card 10 which it is desired to punch. The record card 10 has the usual arrangement of a plurality of columns extending along one axis of the card and a plurality of rows of index points along the other axis. Thus there are provided vertically extending columns 11 for receiving punch designations, the columns being spaced along the longitudinal axis of the card as indicated. Each of columns 11 in the representative card indicated is divided into twelve spaced so-called index areas 12, the index areas of adjacent columns 11 being aligned as indicated. Each of the index areas of a column is assigned a particular significance and is representative of that significance when perforated. The index areas of the record card 11 differ from the usual record card in that each of the index areas is scored or preperforated.

Figure 3:
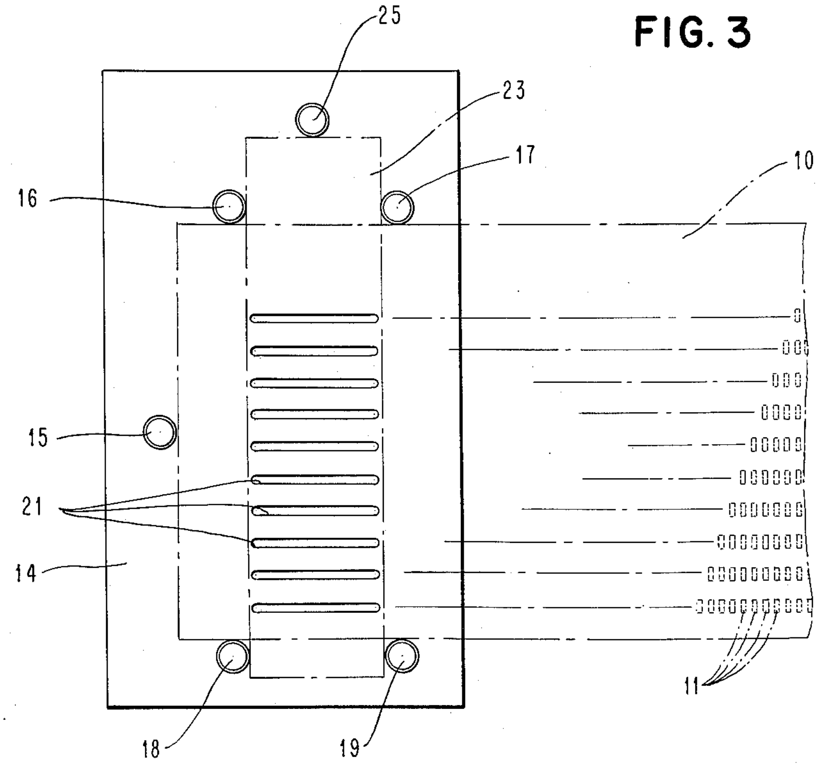
FIG. 3 is a plan view of the die plate element of the punching apparatus.
Figure 4:
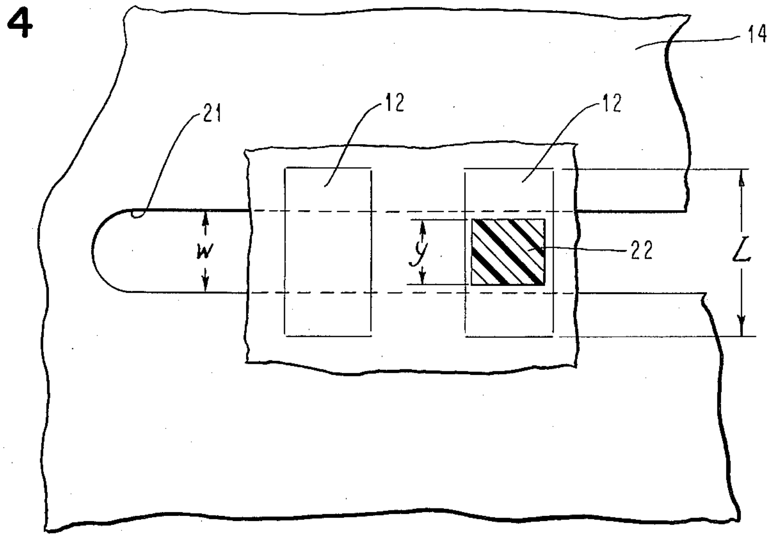
FIG. 4 is a partial diagrammatic plan view illustrating the dimensional relationship of one of the scored punch areas, the associated die plate slot, and a cooperating punch element when a record is in punching position.

In FIG. 7 which is an enlarged view of one of the scored index areas 12 of the record card 10, it will be noted that the scoring operation on the index area comprises 4 "score lines" which define a rectangular area, the score lines not actually intersecting at the corners of the rectangular area. The scoring operation thus effects at each index area a partially perforated rectangular area which is integral with the card body area only at the corners thereof. It will be appreciated that the scoring operation which may be done very accurately when the cards are made, relieves the extremely close tolerances that are normally required in the usual punching element of a punching apparatus to effect a punching of desired index points. In columns of the record 10, the record is registered on a die plate 14 as indicated in FIG. 1 or as indicated by the phantomly outlined card 10 in FIG. 3, so that the left edge of the card engages an upwardly projecting line 15 of the plate 14, the top edge of the card engages upwardly projecting pins 16 and 17 of the die plate, while the lower edge of the card engages upwardly projecting pins 18 and 19 of the die plate 14, as indicated. The die plate or block 14 has twelve spaced slots 21 extending therethrough, as best indicated in FIG. 3, there being a slot for each of the 12 index points of the record card. With the card 10 properly registered on the die block 14 as previously described each of the slots 21 is aligned with corresponding ones of the scored index areas of successive columns of the record card, as indicated in FIGS. 1 and 3. For example, in the diagrammatic view of FIG. 4, a representative one of the slots 21 is indicated as extending across a mid-area of corresponding scored rectangular index areas 12 of two adjacent columns of the record. In the actual punching operation, punch elements 22, one of which is indicated in cross section FIG. 4, are pushed against the unsupported mid-areas of the desired scored index areas of desired columns of the records to forcibly break the unscored corners of the index area and then force the resulting card chip into the adjacent slot 21. The details of this action will be later explained.

Figure 2:
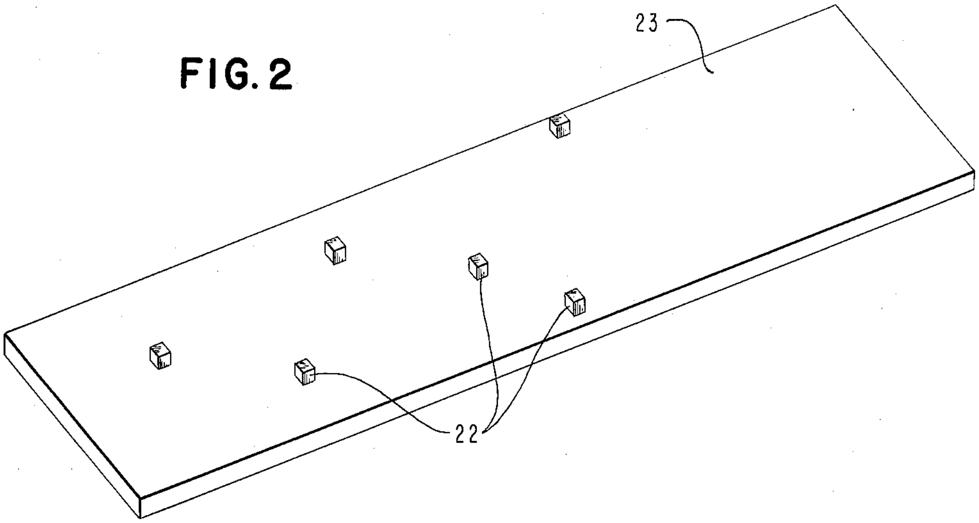
FIG. 2 is a perspective view of the punch plate element of the punching apparatus.

Referring now to FIG. 2, the punch elements 22 are seen to be substantially square in cross section and extend from the surface of a so-called ID (personal identification) card 23. The card 23 and associated punches 22 may be formed of any suitable semi-rigid material such as plastic or metal. The punches 22 may be initially formed integral with the body of the card 23, or they may be rigidly secured thereto in any suitable fashion. The card may be considered to have columns and index points corresponding to the arrangement of the record card and accurately spaced correspondingly thereto. The punches by their relative position in a particular index point or points of a column may be representative of identifying data personal to the owner of the card such as name, address data, account number data, policy number data, or the like, or combinations of such data. Although the card shown in FIG. 2 has only 6 columnar positions (each with 12 possible index point positions) for representing data, this is only representative and the card could be increasing its size contain a number of columns up to the maximum columnar capacity of the record card. Thus in the punching apparatus indicated in FIG. 1, provision is made for punching only the 6 most leftward columns of the record, even though the record has 40 columnar positions. This particular size of the ID plate and associated element of the punching apparatus shown has been chosen to facilitate the perspective illustration in conjunction with the record card as shown in FIG. 1.

With the record card 10 registered in the die plate 14 by the associated registering pins 16, 17, 18 and 19 as previously explained, the identification plate 23 is then placed on top of the record card, punch projections 22 facing the card and registered by the engagement of an upper edge thereof with another upwardly projecting pin 25 of the die plate 14 (FIGS. 1 and 3), the engagement of the left edge of the plate with the pins 16 and 18, and the engagement of the right edge of plate with the die block pins 17 and 19. With the plate thus registered, any projection or projections in the leftmost column of the plate are centrally engaged with the related index area of the leftmost column of the record, as best indicated in FIG. 4, and FIG. 5A, the projections in succeeding columns of the plate being correspondingly aligned with succeeding columns of the record card.

In the preferred embodiment of the invention the dimensions of any slot 21 in the die block 14, the dimensions of the punch projections of the identification plate, and the record card thickness and scored index areas thereof, are all related in a specific manner to achieve the improved punching and chip removal action to be subsequently described.

Thus in FIG. 4 the width W of any slot 21 is equal to approximately ½ of the length L of any index area 12 or $$W=\frac{L}{2}$$

In the card controlled accounting machines with which the record cards 10 are to be used, the various sensing means are arranged for a perforation hole length L of approximately .125 inch. With the length L so established, the slot width $$W=\frac{L}{2}=\frac{.125}{2}=\text{approximately .625 inch}$$

Another one of the dimensional relationships on the punching apparatus is that the width W of any one of the slots 21 (see FIG. 6) is equal to the width Y of any punch projection plus twice the thickness G of the record card or $$W=Y+2G$$

With a record card thickness G predetermined to be approximately .0107 inch, and solving the equation $W=Y+2G$ for Y we obtain $$Y=W-2G=.0625-2(.0107)=.041$$

Another one of the dimensional relationships is that the length L of an index area (chip) is equal to the width Y of any punch projection 22 plus twice the distance F (see FIG. 6) any projection extends above the planar surface of the associated identification plate 23 or $$L=Y+2F$$

solving for F and with the values for L and Y already established as described above we obtain $$F=\frac{L-Y}{2}=\frac{.125-.041}{2}=\text{approximately .042 inch.}$$

The projection distance F of the punch projections is, of course, also the travel of each projection in effecting the punching action.

With the above dimensions and relationships in mind, the actual punching operation is effected as follows: With the record card 10 and the identification plate 23 registered on the die block 14 as previously mentioned, a pressure plate 26 (FIG. 1) having openings 27, 28, 29, 30, 31 and 32 therethrough properly spaced to receive respectively pins 15, 16, 17, 18, 19 and 25 of the die block is positioned over the top of the identification card on the die block 14. Thereafter a manual downwardly applied pressure on the pressure plate completes the punching operation.

Referring to FIG. 5B it will be noted that as the pressure is applied to the pressure plate 26, the resulting pressure on the identification plate 23 is applied through the face of the corresponding projections 22 to the control area of the related scored index area 12 of the record card 10, thus breaking the unscored corners of the index area from the record card. As the projection continues their downward travel, equal openings 34 develop between ends of the chip 12*a* and the record card proper as the chip is forced ahead and formed in a partial U shape by being pressed between the advancing projection and the walls of the slot 21. This forming action results, of course, from the previously described dimension relationship of $W=Y+2G$. By reason of this relationship the width W of the slot is just sufficient to accommodate the width Y of the advancing projection 22 plus twice the card thickness of which is, of course, that portion of the chip 12*a* being formed between each side of the slot and the adjacent advancing side of the projection 22 (FIG. 5B)

As the punching operation is completed, by the abutment of the main planar face of the identification plate 23 with the upper planar surface of the record card 10, each removed index area 12 has accordingly been formed into a complete U shaped chip 12*a* arranged in the corresponding slot 21 as indicated in FIG. 5C. This compete forming action results, of course, from the other previously mentioned relationship $L=Y+2F$. Thus, the length F of each projection above the plane surface of the ID plate 23, this length F, of course, also being the travel of the projection in effecting the punching and in turn the length of each side of the formed U shaped chip, so that the combined length of both sides of the chip is 2F. This factor 2F in conjunction with the width W of projection which, of course, approximately equals the bottom width of the chip, approximately equals the total length L of the chip so that a complete U formed chip is formed in the slot as indicated in FIG. 5C.

Upon the completion of the punching of record card 10 the plate 26 is removed to permit removal of the ID plate 23 and the record card. As the ID plate is lifted from the record card, the U shaped chips in the slots 21 remain therein by a gripping action between the sides of the chips and the walls of the associated slots. Thus in FIG. 5C the punching projection 22 has been removed clear of the slot but the chip 12*a* remains gripped in the slot 21.

On subsequent punching operations in other record cards in the same index area of the same columns, a previously retained U shaped chip, is shifted downwardly by the forming of the instant chip. The particular die 14 as illustrated in FIG. 6 is of a thickness to accommodate three stacked chips, as indicated, so that on a fourth punching operation in that particular position, the chips 12*a* resulting from the first punching operation is ejected from the bottom of the slot 21, as indicated. It is accordingly seen that as a U shaped chip is formed in the slot 21 during a punching operation, its outside corners 12*c* and 12*d* act against the top edges 12*e* and 12*f* of the previous formed chip, thus moving it downwardly in the slot 21. Thus displacement action is carried through the total number of chips in the slot so that the bottom chip is ejected out of the slot. The chips 12*a* consequently move through the slots 24 in an orderly and stacked fashion and jamming of the punching apparatus by chip buildup is prevented. Apparatus, punched records of high quality for subsequent accounting purposes may be easily produced at the source of the originating data.

It will be appreciated that although the die block 14 is described as having a single slot 21 therein for each row of index areas of the record card, individual openings could be provided instead for each possible index area and equivalent chip formation and stacking effected as long as the previously described dimensional relationships are maintained. With reference to one of these dimensions for which is the punch projection length or travel (during punching), this is the minimum length for effecting complete U shaped chip formation. Greater lengths off than this minimum may be used and the same chip formation, stacking, and chip advancing action will be achieved, the only difference being that each chip as formed is initially displaced further into the receiving slot in the die plate. Greater projection lengths also make the ID punching plate slightly less convenient for carrying in the pocket or the like.

Referring now to FIGS. 8A and 8B there is shown an alternate embodiment of the punching apparatus. In this embodiment, the punching projections of the identification plate are essentially wedge shaped as indicated. There is provided a die block 38 having slots 39 similar to the die block described previously for the preferred embodiment. Secured to the upper surface of the die block 38 is a rubber sheet 40 having an individual slit extending centrally above each of the slots 39. The scored record card 10 to be punched is laid flatwise on top of the rubber sheet 40 whereafter the identification plate 37 is positioned, wedge projections down, on top of the scored record card. Suitable guide pins are provided on the die block 38 for properly registering the ID plate 37, and the record card 10, on the die block 38 with its associated rubber sheet 40. The punching plate 37 is then pressed against the record card to effect the punching operation, the wedge shaped projections 36 punching the associated chips from the card, the chips being forced by the advancing wedges projection through the corresponding slit in the rubber backing, and into the slot 39 as indicated in FIG. 8A. The lips of the slit in the rubber sheet are deflected open by the advancing wedge and drips as indicated. The resiliency of the walls of the rubber slit resist to some extent the advance of the wedge and associated chip, and achieves a clear removal of the chip rather than an undesirable folding action of the chip around one of the scored sides thereof. On a removal of the punching plate 37, the lips of the slit snap shut behind the retreating wedge projection 36. The width of the slots 39 is larger than the corresponding dimension of the chip, so that the chip falls freely through the slot 39 and is discharged from the bottom thereof.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore to be limited only as indicated by the scope of the following claim.

What is claimed is:

Apparatus for punching a record card in correspondence to data representations of a personal identifying punch plate, said record card having a plurality of scored rectangular index areas arranged in rows and columns, said apparatus comprising, in combination, a backing plate having spaced elongated slots extending therethrough, one slot for each said rows and spaced identically thereto, each of said slots being of a width approximately ½ the length of anyone of said scored rectangular areas, a punch plate having punching projections properly spaced for coincidence with the locations of desired index areas of said columns, each of said punch projections being rectangular in cross section and having a width equal to the width of anyone of said slots less twice the thickness of said record card, each of said punch projections extending from the planar surface of said punch plate a distance equal to one half the difference between the length of anyone of said index areas and the width of anyone of said punch projections, guide means secured to said backing plate for accurately registering a record card thereon in punching position with each row of said card aligned with a related one of the slots of said backing plate, the index areas of each row extending lengthwise across the width of the related slot with a mid-section of each area overlying the slot, guide means secured to said backing plate for accurately registering said punch plate adjacent said record card with each punch projection centrally engaging said overlying mid-section of the related index area, the width dimension of each punch projection extending transversely to the longitudinal axis of the slot, a pressure plate for manually applying a uniform pressure to said punch plate to force each said punch projections against said associated engaged area of the related index area to remove said index area from the body of the record, said removed area being formed into a substanatially U shaped chip about said punch projection and between the walls of said slot and the punch projection as it advances into the slot, said U shaped chip being completely disposed in said slot as the planar body of the punch plate abuts the planar surface of the record card to complete the punching action, the formed sides of said U shaped chip gripping the walls of the adjacent slot with said chip being retained therein or a subsequent removal of the pressure plate, punch plate and record card from punching position.

References Cited in the file of this patent

UNITED STATES PATENTS

| | | |
|---|---|---|
| 924,555 | Jenkins | June 8, 1909 |
| 2,102,292 | St. Louis et al. | Dec. 14, 1937 |
| 2,604,167 | Oliver | July 22, 1952 |
| 2,906,335 | Love | Sept. 29, 1959 |